(12) United States Patent
Ohnishi

(10) Patent No.: US 6,617,063 B1
(45) Date of Patent: Sep. 9, 2003

(54) BATTERY UNIT AND ELECTRONIC APPARATUS

(75) Inventor: Masuo Ohnishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/613,417

(22) Filed: Jul. 10, 2000

(30) Foreign Application Priority Data

Aug. 31, 1999 (JP) .......................... 11-244386
Sep. 9, 1999 (JP) .......................... 11-255442

(51) Int. Cl.$^7$ .............................. H01M 2/06
(52) U.S. Cl. ........................ 429/7; 429/97; 429/122
(58) Field of Search .................. 429/7, 8, 9, 96, 429/97, 122, 123, 163, 179, 100, 153, 154, 162

(56) References Cited

U.S. PATENT DOCUMENTS

| | | | | |
|---|---|---|---|---|
| 4,515,872 A | * | 5/1985 | Okano | 429/65 |
| 5,399,446 A | | 3/1995 | Takahashi | 429/90 |
| 5,552,958 A | | 9/1996 | Seto et al. | 361/683 |
| 5,566,050 A | | 10/1996 | Seto et al. | 361/686 |
| 5,621,618 A | * | 4/1997 | Komiyama | 361/732 |
| 5,841,630 A | | 11/1998 | Seto et al. | 361/683 |
| 5,905,632 A | * | 5/1999 | Seto et al. | 361/683 |
| 6,233,141 B1 | * | 5/2001 | Lee et al. | 361/683 |
| 6,274,266 B1 | * | 8/2001 | Wang | 429/163 |

FOREIGN PATENT DOCUMENTS

| | | |
|---|---|---|
| JP | 05-004421 | 1/1993 |
| JP | 06-020665 | 1/1994 |
| JP | 06-089126 | 3/1994 |
| JP | 09-305261 | 11/1997 |

OTHER PUBLICATIONS

Fujitsu catalogue on FMV BIBLO, Jul. 1999 (abstract with English Translation).

* cited by examiner

Primary Examiner—Randy Gulakowski
Assistant Examiner—Monique Wills
(74) Attorney, Agent, or Firm—Armstrong, Westerman & Hattori, LLP

(57) ABSTRACT

The present invention provides a battery unit that is detachably attached to such an electronic apparatus as a notebook computer and maximizes the space efficiency with an expansion unit in the electronic apparatus. The battery unit includes a battery-unit extending portion that perpendicularly overlaps a relatively thinner portion of the expansion unit that is also detachably attached to the electronic apparatus and realizes a predetermined function when the expansion unit is connected to the electronic apparatus. The overlapped thinner portion and the battery-unit extending portion maximize efficiently the space in the electronic apparatus.

11 Claims, 7 Drawing Sheets

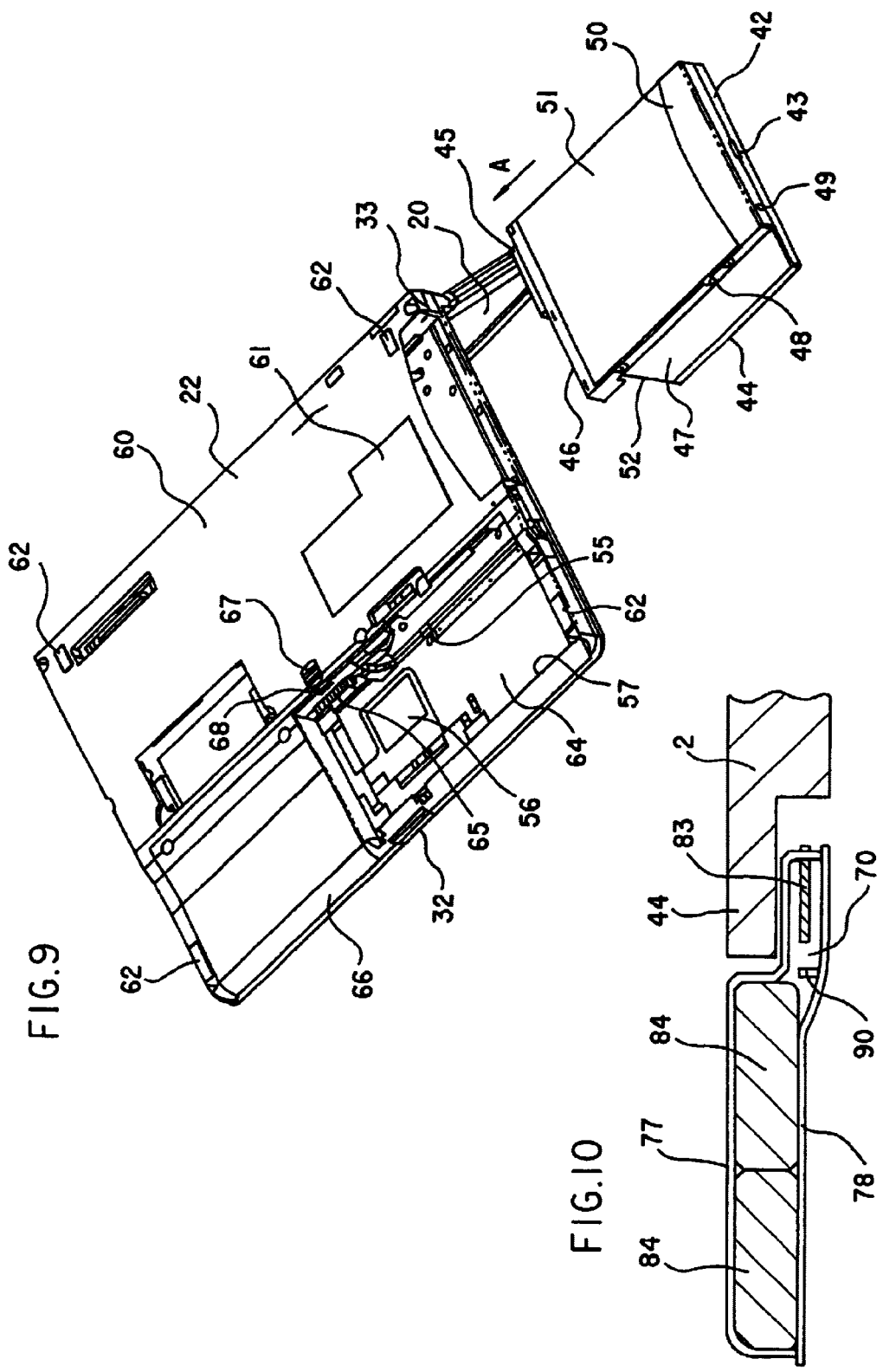

BATTERY UNIT AND ELECTRONIC APPARATUS

BACKGROUND OF THE INVENTION

The present invention relates to battery units that are detachably connectable to a portable electronic apparatus such as a notebook personal computer ("PC"), as well as the portable electronic apparatus that are mounted with the battery unit.

Portable electronic apparatuses, typified by notebook PCs, portable computers, portable information terminals, portable information processors, portable terminals, etc., have been required to reduce its size and weight, while demanded to have more functions. The notebook PCs are designed to include a system achieving its functions in an A4-sized, B5-sized, or other portable-sized housing, and can, as necessary, be detachably mounted with an expansion unit for changing and extending its capabilities. The expansion units are mounted in a user-detachable/attachable manner in a storage portion of the notebook PC, which is called expansion bay, multi-purpose bay, multi-bay, selectable bay, or the like. The expansion units have various structures in accordance with its functions to be added, as seen in a CD-ROM disk drive, a 3.5-inch floppy disk drive, a power supply, an image pick-up device camera unit, a PC card slot, a printer, a scanner, and a network device, etc.

The various expansion units like these are packaged in a housing of a usually common size, and an expansion unit having a necessary function is configured to be attachable to the computer body by inserting it from the housing into the computer body through the side or bottom of the keyboard. Any other necessary function becomes available in the computer by substituting the currently used unit with another one.

In addition to such an expansion unit, a battery unit having a built-in battery is detachably connectable to a notebook PC. The battery unit may usually be attached to and detached from a keyboard body of the notebook PC through its rear or side surface, and includes a battery of increased capacity to assure a longer operation where an external power supply is not available.

FIGS. 11 and 12 show an example of a conventional battery unit. This conventional battery unit 100 has an approximately rectangular parallelepiped housing 101, in which a battery (not shown) is arranged. The battery unit 100 includes a connector 102 at one sidewall for supplying power to the computer inside, and also a partly recessed area 103 at the other sidewall. The connector 102 has a structure of two or more narrow belt-shaped electrodes arranged along the sidewall, and each electrode is partitioned with a synthetic resin material that constitutes the housing 101. The notebook PC has display and keyboard bodies that are openable through a hinge mechanism, and the battery unit is detachably attached to the bottom of the keyboard body, serves as a power supply for portable use without an external power supply.

The portable electronic information terminals including notebook PCs have been increasingly demanded to serve as a multifunctional unit, and thus indispensably require detachable expansion units that are exchangeable according to required functions such as so-called selectable bays to realize those demanded functions. This expansion unit occupies a certain space when loaded into the keyboard body of the computer. As discussed, the conventional portable electronic information terminal requires the battery unit to be loaded while loading the expansion unit, by arranging them at the bottom of the keyboard body.

The battery unit is further demanded to include a battery having larger capacity as well as higher performance to serve as a long-term power supply battery. Although the increased battery capacity requires an increased battery space, the battery space is restricted by the computer keyboard body size, such as A4, B5 and the like, and the battery space has been hardly expanded and secured particularly at the area adjacent to the expansion unit.

BRIEF SUMMARY OF THE INVENTION

Therefore, in view of the foregoing technical issues, it is an exemplified object of the present invention to provide a novel and useful battery unit that is loadable into a keyboard body of a notebook PC, etc., next to an expansion unit, and provides an efficient space arrangement. It is another exemplified object of the present invention to provide a portable electronic apparatus into which the above battery unit is loaded.

In order to achieve the above objects, a battery unit according to the present invention is attachable to an electronic apparatus that is detachably mounted with an expansion unit that realizes a predetermined function when connected to the electronic apparatus. The battery unit comprises a battery, and a housing that accommodates the battery, and partially overlaps the expansion unit in a thickness direction of the housing. This overlap would efficiently maximize the space in the electronic apparatus.

In a preferred embodiment of the present invention, the battery unit further comprises a connector at a side surface thereof connectable with the electronic apparatus. The housing includes a battery-unit extending portion that may overlap the expansion unit in the expansion unit in the thickness direction of the housing, and said battery unit further comprises a circuit board accommodated in the battery-unit extending portion. The battery-unit extending portion has a bent shape in the housing, and the battery unit further comprises a partition between the circuit board and the battery in the housing.

The electronic apparatus according to the present invention comprises a main housing, an expansion unit that is detachably attached to the main housing, and realizes a predetermined function when the expansion unit is attached to the main housing, and a battery unit attachable to the main housing, the battery unit serving as a power supply and partially overlapping the expansion unit in a thickness direction of the battery unit. This overlap would efficiently maximize the space in the electronic apparatus.

In a preferred embodiment of the present invention, the expansion unit includes a thinner portion whereas the battery unit includes a battery-unit extending portion, and wherein the battery-unit extending portion and the thinner portion overlap each other and maintain a continuous surface with said main body. The battery unit extends longer than the expansion unit in a moving direction of the expansion unit in which the expansion unit is movable to be attached to and detached from the main housing, and wherein the battery unit includes a connector that is connectable to the electronic apparatus and outside the battery-unit extending portion. The expansion unit and the battery unit are made so stepwise to partially overlap each other. The expansion unit and the battery unit overlap each other by a surface contact in the electronic apparatus. The thinner portion includes a thin oblique surface that is obliquely provided relative to in a moving direction of the expansion unit in which the expansion unit is movable to be attached to and detached from the main housing, and wherein the battery-unit extending portion includes a battery oblique surface that is obliquely provided relative to the moving direction to engage the thin oblique surface of the thinner portion. The expansion unit is detachably attached to the main body through a side of the main body, and the battery unit is detachably attached to the main body through a bottom of the main body.

Other objects and further features of the present invention will become readily apparent from the following description of the embodiments with reference to accompanying drawings.

BRIEF DESCRIPTION OF DRAWINGS

FIG. 9 is a perspective view of the portable electronic apparatus and expansion unit viewed from the bottom of the apparatus.

FIG. 10 is a sectional view of the loaded battery and expansion units.

DETAILED DESCRIPTION OF INVENTION

A description will now be given of a preferred embodiment of the present invention, with reference to the drawings.

Figure 1:
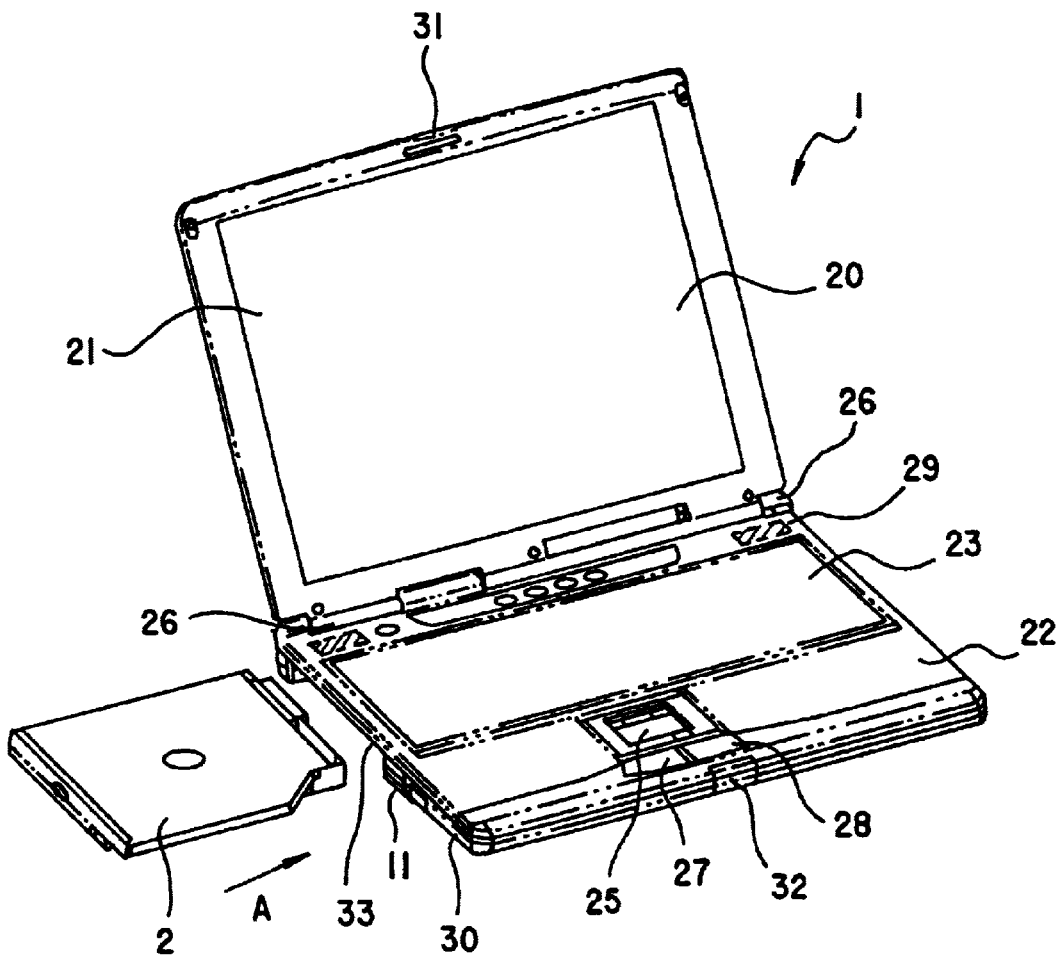
FIG. 1 is a perspective view of an exemplary notebook PC as a portable electronic apparatus of the present invention and an expansion unit attached to the PC.
Figure 2:
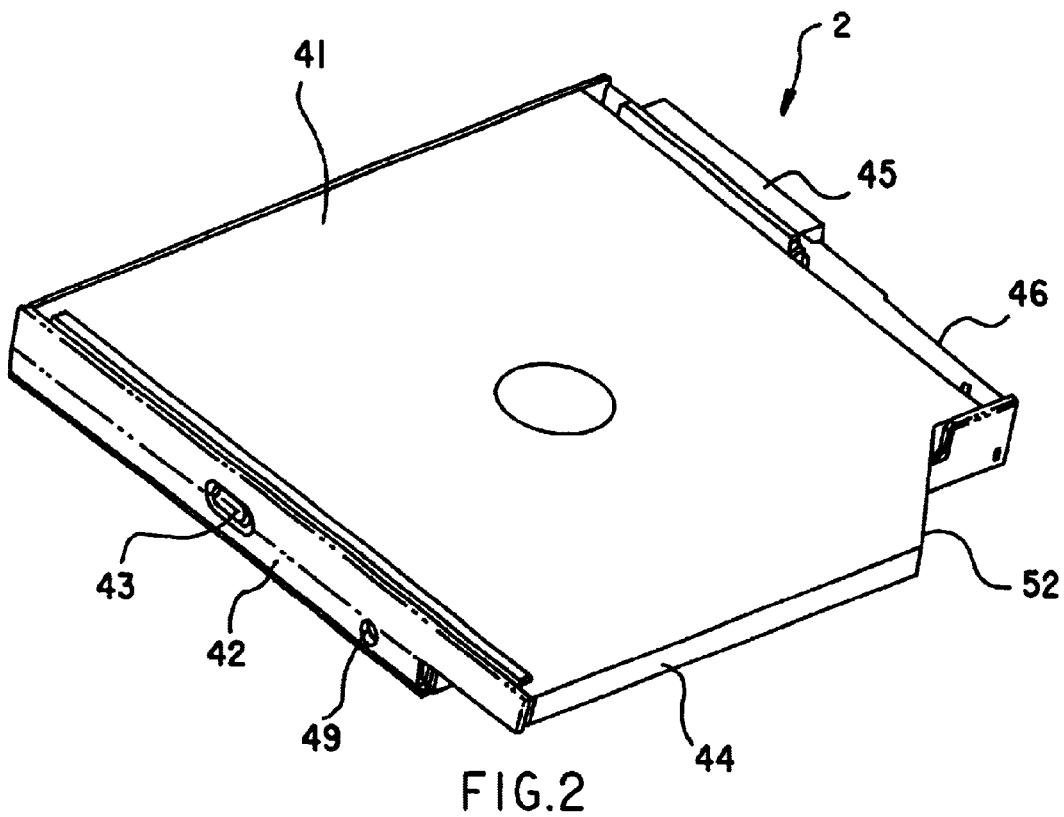
FIG. 2 is a perspective view of the expansion unit viewed from its top.
Figure 3:
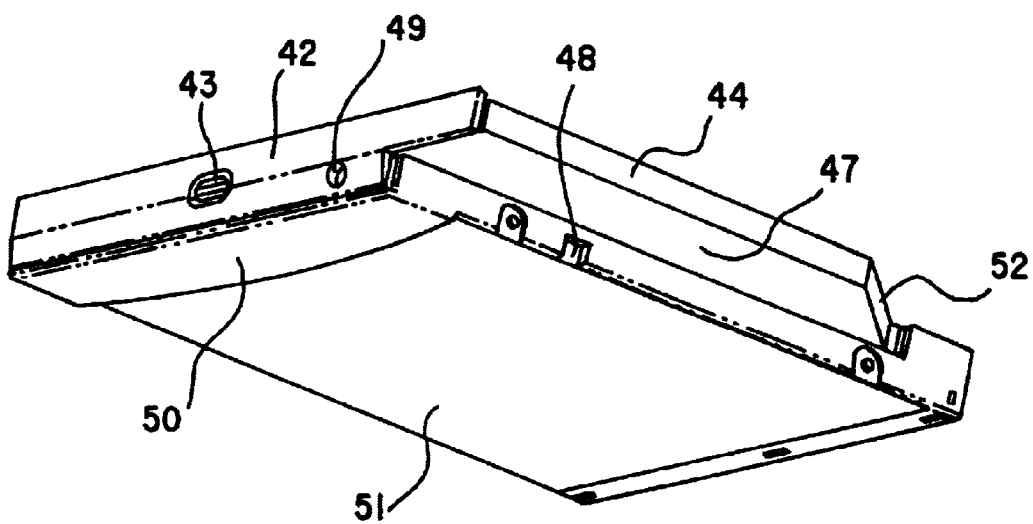
FIG. 3 is a perspective view of the expansion unit viewed from its bottom.

This embodiment uses an exemplified portable electronic apparatus or notebook PC as the portable electronic apparatus, and a battery unit loadable in the notebook PC. Referring first to FIGS. 1 through 3, a description will be given of the notebook PC and an expansion unit.

The inventive portable electronic apparatus is now exemplified by, but not limited to, a notebook PC, and is also applicable to a portable computer, a portable information terminal, a portable information processor, a portable terminal, a PDA, a portable information processor using a stylus, or the like. It is also applicable to apparatuses other than such electronic apparatuses as may be called computer or electronic apparatus.

In FIG. 1, a computer 1 is a notebook PC that is configured to open and close via hinge mechanisms 26, 26. The computer 1 includes a display body 20 at one side that has a liquid crystal display 21, and a keyboard body 22 at the other side that has a keyboard section 23. The keyboard section 23 is provided with a plurality of keys although its detailed illustration is omitted. There are various keyboard types applicable such as the JIS key arrangement, the QWERTY key arrangement, the 101-keyboard, or 109-keyboard arrangement, and any other keyboard arrangement. The keyboard may include all or any of Japanese-character keys (Kana keys), alphabet keys, and numeric keys. The display body 20 and the keyboard body 22, each having an approximately rectangular parallelepiped housing, can be bent via the hinge mechanisms 26, and closed completely for portability purposes by engaging a latch mechanism 31 at a display side and a latch mechanism 32 at a keyboard side.

As an input part, the keyboard 23 is picked up for an example, but a touch panel, a digitizer, or other input devices may be used.

The keyboard body 22 which has a keyboard section 23 includes a palm rest part in front of the keyboard section 23, a touch pad part 25 at a position a little to the left of the midsection of the palm rest part, and a pair of buttons or a left button 27 and a right button 28 in front of the touch pad part 25. Without an external mouse connected, the computer is controllable by operating the touch pad part 25 and the buttons 27, 28. A pair of speakers 29, 29 that give sounds are placed, as necessary, at corners on the keyboard body 22 between the keyboard section 23 and hinge mechanisms 26.

At a left-hand side portion 30 of the notebook PC having the above configuration, an insertion slot 33 for accommodating an expansion unit 2 is provided around the keyboard section 23, and the expansion unit 2 may be inserted into the computer 1 in a direction A in the drawing through the insertion slot 33.

FIGS. 2 and 3 both are perspective views of the expansion unit 2 that is a CD-ROM disk drive. Provided on a front side of the expansion unit 2 is a face panel 42, which is integrated with a side portion 30 of the computer 1 to form one side surface when the expansion unit 2 is attached to the computer 1. A button 43 that is pressed to pull out a tray (not shown) for inserting and ejecting a disk is provided about the midsection of the face panel 42. An indicator light 49 that goes on when a disk is inserted is provided diagonally below the button 43. The expansion unit 2 has an approximately rectangular parallelepiped housing, and includes a top surface 41 that is made broader than a bottom surface 51, projecting only an approximately upper portion at one sidewall so as to form a thin portion 44. Considering the size of a CD (compact disc), the upper part of the housing may accommodate the CD tray while a lower part of the housing no CD tray to minimize the space. As shown in FIG. 3, the thin portion 44 includes a middle surface 47 parallel to the top and bottom surfaces 41, 51 in the expansion unit 2, and a lock groove 48 below the middle surface 47 on a sidewall of the expansion unit 2. The lock groove 48 is used to prevent the expansion unit 2 from dropping off.

A rear surface of the thin portion 44 is cut away obliquely relative to a moving direction of the expansion unit 2 to correspond to the disc shapes of CDs and CD-ROMs without uselessly occupying a surrounding space of the expansion unit 2. The expansion unit 2 includes a connector 45 at its rear surface 46 that provides an electric connection with the computer body as a result of a connection with a connector in the computer when the expansion unit 2 is inserted into the computer. The expansion unit 2 sends and receives an electric signal via this connector 45 to activate its desired function. Further, the expansion unit 2 includes an apron portion 50 at the bottom surface 51 and at the side of the face panel 42. The apron portion 50 forms a continuous surface with the bottom surface of the computer 1 when the expansion unit 2 is attached to the computer 1.

The thin portion 44 is a portion projecting one of upper sidewalls of the expansion unit 2, and obliquely cut away without extending to its rear surface, thus forming a thin oblique surface 52 relative to the moving direction of the expansion unit 2. This thin oblique surface 52 maximizes the space at the rear side of the expansion unit 2. The thin oblique surface 52 forms an angle of about 45° with respect to the insertion direction of the expansion unit 2 to correspond to the circular shape of a CD, etc.

Figure 4:
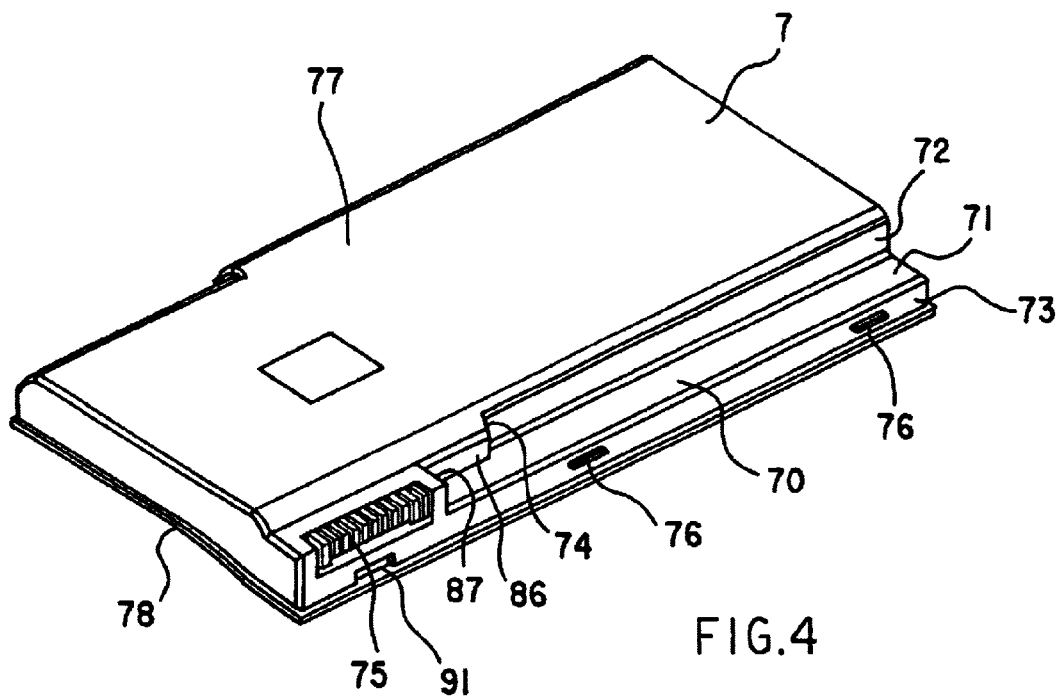
FIG. 4 is a perspective overview of a battery unit according to the present invention.
Figure 5:
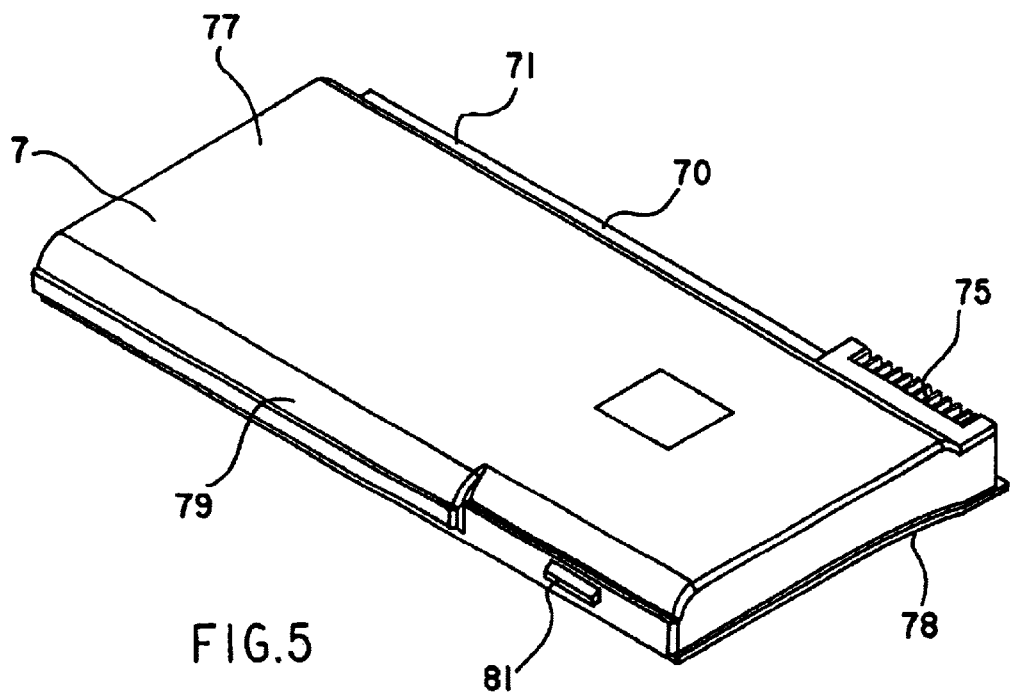
FIG. 5 is a schematic perspective view of the battery unit.

Next, a description will be given of a structure of the battery unit 7 with reference to FIGS. 4 through 8. FIGS. 4 and 5 illustrate the contour of the battery unit 7. The battery unit 7 assumes an approximately rectangular parallelepiped shape having a required thickness. A top surface 77 of the battery unit 7 has an approximately flat shape, and a battery-unit extending portion 70 forming a stepped portion at a sidewall on the side of the connector 75, as will be described later. A bottom surface 78 of the battery unit 7 has such a material and shape as to form one common continuous surface with the bottom surface of the computer 1, and especially in the present embodiment, a portion on the side opposite to where the connector 75 is placed or the front side is a little raised. In other words, a portion on the side near the hinge mechanisms 26 of the keyboard body 22 of the computer 1 lies on an approximately entire surface at its bottom, while a front side portion on the side apart from the hinge mechanisms 26 of the keyboard body 22 of the computer 1 is a little isolatedly raised. The battery unit 7 has approximately vertical sidewalls at its both ends in the longitudinal direction, and is set longer than the expansion unit 2. Accordingly, when the expansion unit 2 and battery unit 7 are loaded side by side through the side portion 30 of the computer 1, the battery unit 7 extends farther from the side portion 30.

A detailed description will be given of the battery-unit extending portion 70 at the sidewall having the connector 75. The battery unit 7 is structurally cut away so as not to interfere with the thin portion 44 of the expansion unit 2, and consequently positions the battery-unit extending portion 70 under the thin portion 44 of the expansion unit 2 when loaded. In other words, the battery-unit extending portion 70 at the sidewall has a vertical upper sidewall 72 extending downwardly from the top surface 77 to an approximately middle height, a level surface 71 extending from a lower end of the sidewall 72, and a vertical lower sidewall 73 downwardly extending from an end of the level surface 71. The total height of the upper sidewall 72 and lower sidewall 73 is the same as the height of the battery unit 7. The width of the level surface 71 corresponds to the size of the thin portion 44 of the expansion unit 2. The upper sidewall 72 straightly extends along the length of the battery unit 7 toward the connector 75, but does not reach the connector 75, and a battery side oblique surface 74 is obliquely formed in the way. The battery side oblique surface 74, extending from the end of the upper sidewall 72, has the same height as that of the upper sidewall 72, and a straight second upper sidewall 86 extends from the end on the connector 75 side of the battery side oblique surface 74 along the length of the battery unit 7. The second upper sidewall 86 extends to an extension end portion 87 before the connector 75, and the extension end portion 87 includes a surface normal to the second upper sidewall 86 or the length of the battery unit 7. The level surface 71 between the upper sidewall 72 and the lower sidewall 73 also extends to the extension end portion 87, and does not reach the connector 75. Accordingly, the stepwise portion of the battery-unit extending portion 70 is not formed near the connector 75 formed at the side of the battery unit 7, but the connector 75 is located in a lower position than the top surface 77 of the battery unit 7 so as to match the shape of the bottom surface 78.

A pair of spaced engagement portions 76, 76 are provided on the lower sidewall 73. When the battery unit 7 is to be fixed onto the bottom of the computer 1, the battery unit 7 as a whole is attached by inserting these engagement portions 76, 76 into corresponding concaves inside the computer 1. A concave 91 serves as a latch under the connector 75 when the battery unit 7 is loaded into the computer 1. When the battery unit 7 is loaded, an engagement piece 68 which will be described later is engaged with the concave 91, and prevents the battery unit 7 from easily falling off. A projection 81 is formed on a side surface 79 opposite to the connector 75 side, and designed to engage the engaging concave (not shown) formed inside a battery-unit insertion portion in the computer 1 when the battery unit 7 is loaded.

Figure 6:
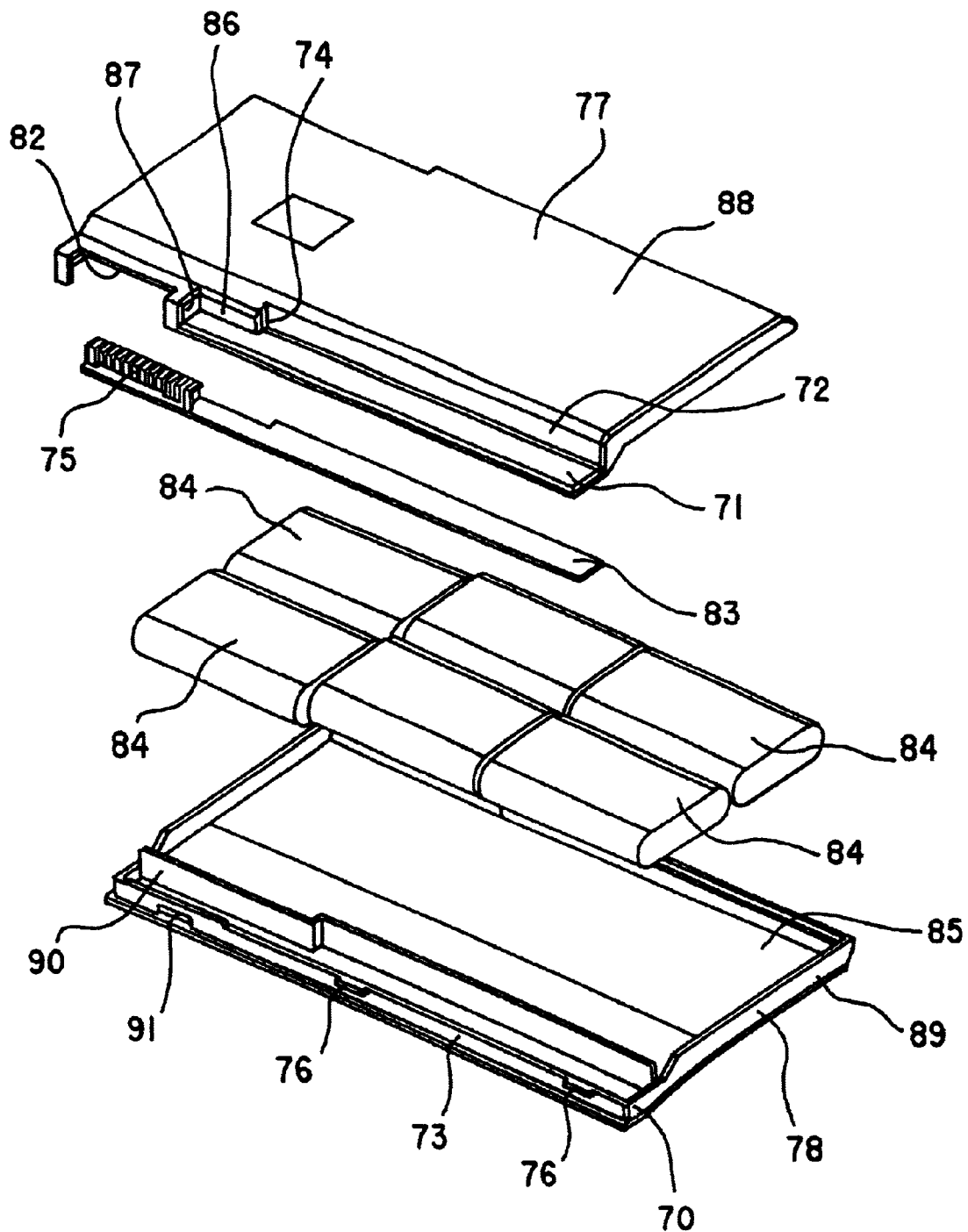
FIG. 6 is an exploded perspective view of the battery unit.
Figure 7:
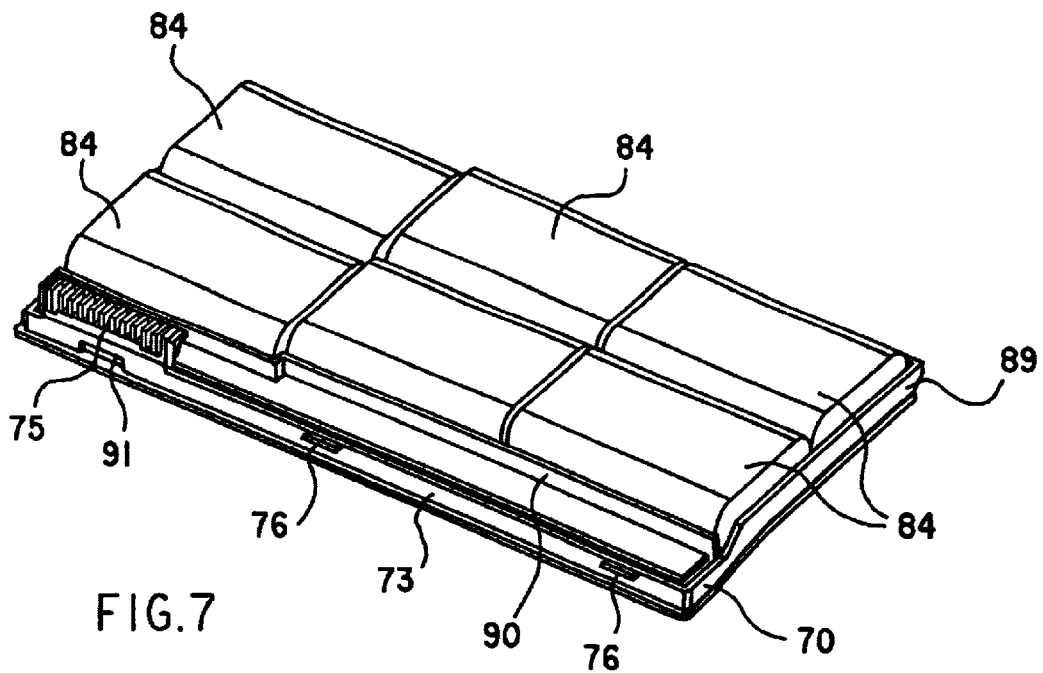
FIG. 7 is a perspective view of the battery unit with its top cover removed.
Figure 8:
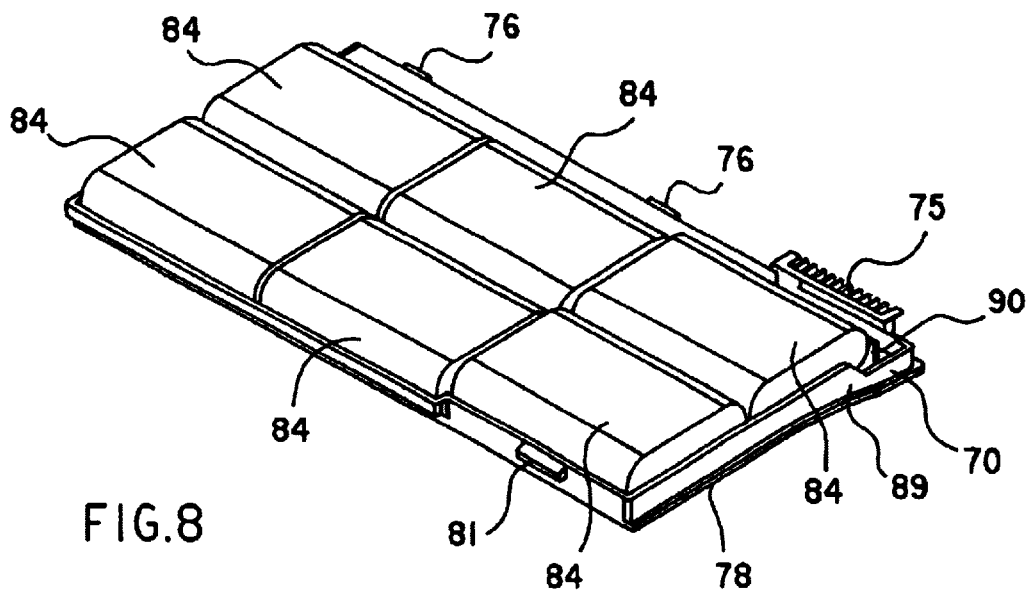
FIG. 8 is another perspective view of the battery unit with its top cover removed.
Figure 11:
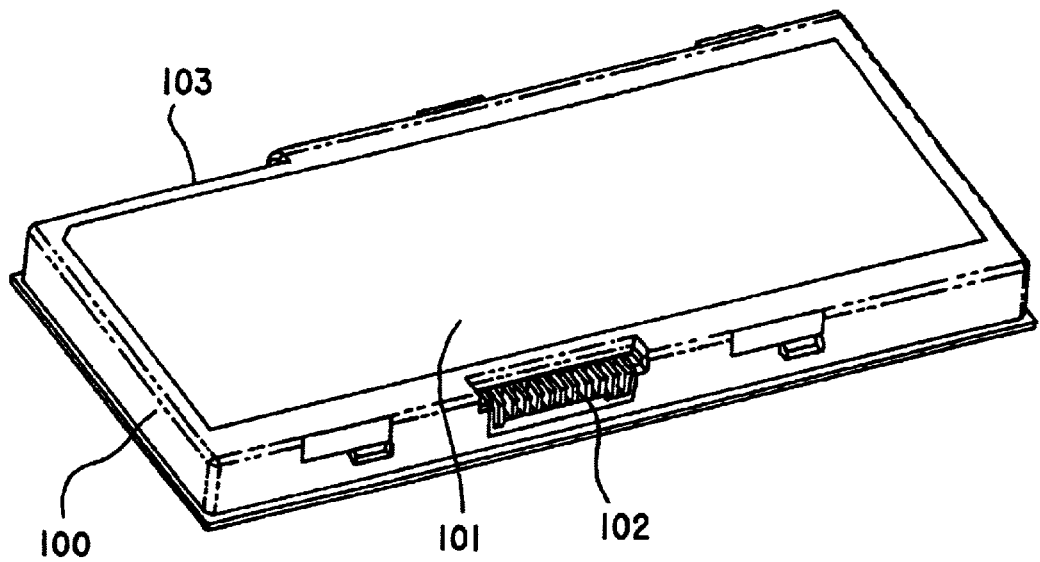
FIG. 11 is a perspective view of an exemplary conventional battery unit.
Figure 12:
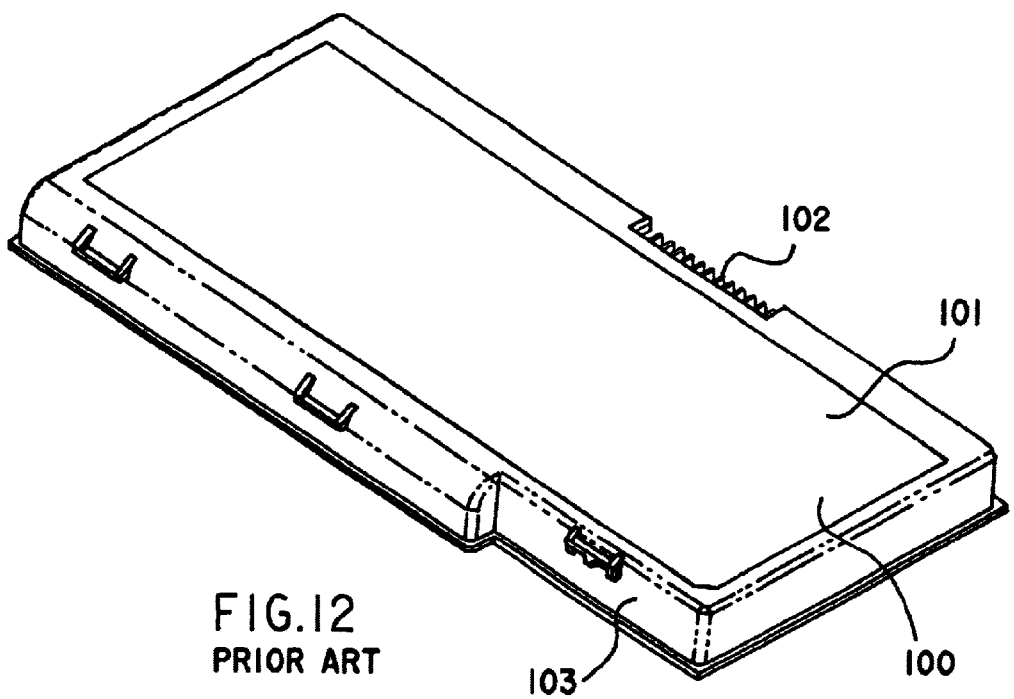
FIG. 12 is another perspective view of the conventional battery unit.

FIG. 6 is an exploded perspective view of the battery unit 7, and FIGS. 7 and 8 each illustrates the battery unit with its top cover removed. A housing of the battery unit 7 constitutes upper and lower cover portions 88 and 89 engaged in the vertical direction, and accommodates in them battery cells 84 divided into six pieces of two rows by three columns. The upper cover portion 88 mainly defines the top surface 77 and also occupies an approximately upper half of the battery unit 7 at its peripheral. The upper cover portion 88 further defines the level surface 71 and the upper sidewall 72 of the battery-unit extending portion 70, the battery side oblique surface 74, the second upper sidewall 86, and the extending end portion 87. A rectangular cutaway portion 82 at the side of the top cover 88 may accommodate the connector 75, and the connector 75 projects out of the side of the battery unit 7 when fitted into the cutaway portion 82.

The connector 75 structurally includes two or more narrow belt-shaped electrodes that are arranged along the sidewall and partitioned with a synthetic resin, etc. This connector 75 is connected with a circuit board 83 although the circuit board 83 does not appear on the joined upper and lower cover portions 88 and 89, and includes part of power-supplying and/or charging circuits. The board 83 is belt-shaped, and the connector 75 is provided at its end. The other portion of the board 83 is located inside the battery-unit extending portion 70 of the battery unit 7.

Mounted into the board 83 but not illustrated is an over-discharge/overcharge protection control circuit that checks, in response to each cell voltage, the presence of the over-discharge and overcharge, and outputs a control signal to a discharging/charging FET. The over-discharge/overcharge protection control circuit itself is known in the art. This over-discharge/overcharge protection control circuit may use as an example the inventions disclosed in Japanese Patent Application Laid-Open No. 10-322915, entitled "Protection Circuit and Battery Unit" and technique disclosed in the prior art section in this reference, although this reference does not intend to claim the over-discharge/overcharge protection circuit itself as an invention.

A brief description will now been given of the over-discharge/overcharge protection circuit. A secondary battery when used as a power supply should be prevented from being overcharging and over-discharging. The overcharge and/or over-discharge would break down the material inside the secondary battery, and consequently would disadvantageously reduce its battery capacity. The repeated overcharge and over-discharge would lower the battery capacity, and lose its battery life. The countermeasure method often monitors the battery voltage, and cuts off a charge path when the battery voltage exceeds a preset voltage during the charge period, or cutting off a discharge path when the battery voltage becomes less than a preset voltage during the discharge period. For example, voltages in the battery cells are monitored during the charge period, and an increase of any one of the voltages in the battery cells over the predetermined voltage is determined to be an over-voltage, leading to open an overcharge protection FET, cut off the charge path to stop charging. The FET is provided between the battery cells and the connector 75. Similarly, in using the battery (i.e., during the discharging period), voltages in the battery cells are monitored, and a decrease of any one of the voltages in the battery cells below a predetermined voltage is determined to be an over-discharging, leading to open an over-discharge protection FET, cut off the discharge path to stop discharging. This FET is also provided between the battery cells and the connector 75.

Although the above example monitors voltages in the respective cells, voltages in two or more parallel-connected battery cells may be monitored instead.

The foregoing voltage monitoring circuit is made using a comparator, a resistor, and a comparative power supply for monitoring voltages, etc. or may be fabricated as one-chip IC as a voltage-monitoring unit. These circuits are mounted on the board 83. Alternatively, over-discharge and/or overcharge preventing FETs may also be mounted on the board 83. Although the drawing shows the board 83 only, the board 83 actually includes electronic components of the above circuits, chips, etc. and a printed wiring pattern. The detailed circuit configuration is omitted for illustration purposes.

The mounted circuits may include, but not be limited to, the over-discharge/overcharge protection circuit, a control circuit, chip, and memory based on the smart battery standard. The smart battery standard stores battery control information in a battery, and controls charging and discharging of the battery based on the information, or indicates a remaining amount in the battery on the information processing equipment connected with the battery. The battery control information includes a voltage or remaining amount in the battery, and the fully charged voltage. A memory for storing such information, a control circuit and chip based on smart battery standards may be mounted on the board 83. These circuit components are, however, omitted for illustration purposes.

The six battery cells 84 are arranged in two rows by three columns. In particular, this embodiment arranges two cells at the connector 75 side closer to the connector 75 to match a concave in a side surface 79 of the battery unit 7 or a front surface of the computer 1. The concave in the front surface of the computer 1 contributes to the space for a latch mechanism in the display body. The battery cell 84 may be selected from any chargeable battery such as a nickel-cadmium battery, and a lithium secondary battery. Each battery cell 84 has a flat cross section, and covers an area other than the battery-unit extending portion 70 of the battery unit 7 when all the six cells are tiled as above.

The lower cover portion 89 defines a lower half portion of the battery unit 7, and constitutes side and bottom portions of the battery-unit extending portion 70 containing the board 83 connected with the connector 75. The lower cover portion 89 also includes at its side engagement portions 76, 76 on the lower sidewall 73. The lower cover portion 89 accommodates a leakproof partition wall 90 extending perpendicularly from the bottom surface 85 of the lower cover portion 89 to prevent possible leakage from the battery cells 84 or the like. The leakproof partition wall 90 is provided parallel to the built-in battery cells 84 at the side of the connector 75. Since the battery-unit extending portion 70 is bent down as described above, no leakproof partition wall 90 would cause the battery leakage to reach the board 83. short-circuiting or rust the board. On the other hand, the provision of the leakproof partition wall 90 in the lower cover portion 89 eliminates these leakage-derived problems. Provided on a surface of the lower cover portion 89 under the connector 75 is a concave 91 that forms a latch when the battery unit 7 is loaded into the computer 1. The concave 91 is engaged with the engagement piece 68 which will be described later when the battery unit 7 is loaded, and prevents the battery unit 7 from falling off.

The battery unit 7 having such a general structure as described above is loaded into the computer 1 in such a manner that the thin portion 44 of the expansion unit 2 and the battery-unit extending portion 70 of the battery unit 7 may overlap each other in the thickness direction f the battery unit 7, as shown in FIGS. 9 and 10, so as to maximizing the space inside the keyboard body of the computer 1.

FIG. 9 is a perspective view of the portable electronic apparatus (computer) 1 viewed from its bottom, and the expansion unit 2 is inserted and loaded into the keyboard body 22 of the computer 1 in a horizontal direction, namely, in the direction A in the figure. The bottom surface 60 is provided with a pad portion 62 made of sponge, rubber, or the like at its four corners to block a direct transmission of vibrations, etc. to the computer 1, and a label 61 indicating a lot number, specifications, a manufacturer, etc.

The expansion unit 2 is loaded into the computer 1 through the insertion slot 33 near a hinge mechanism (not shown), i.e., a back of the computer 1. The expansion unit. 2 includes the projecting thin portion 44 at the upper side as described above, and the thin oblique surface 52 forming an angle of 45° relative to its inserting direction at a back of the thin portion 44. When the expansion unit 2 is inserted and completely loaded through the insertion slot 33, the connector 45 at the back surface of the expansion unit 2 becomes connected to the connector (not shown) in the computer, whereby the expansion unit 2 works to realize a predetermined function.

In FIG. 9, a lid portion 66 for an expanded memory is provided at the back of the palm rest portion. The lid portion 66 opens when the expanded memory is to be mounted into the computer 1 and closes when the mount action ends. A battery-unit opening 57 is adjacent to the lid portion 66, overlapping the thin portion 44 of the expansion unit 2. This opening 57 for the battery unit 2 is so large that the lid portion 66 and the opening 57 may fully cover the back of the palm rest portion, and the size of the opening 57 corresponds to the rim of the expansion unit 2. The thin portion 44 of the expansion unit 2 in this embodiment as well as a routed heat pipe 55 and a back of the touch panel portion 56 are located in the opening 57.

When the battery unit 7 is to be loaded into the computer 1, the projection portion 81 facing the bottom portion 60 of the computer 1 is made engaged with the engagement concave, and then the opposite end is fitted to the bottom portion 60. At the same time, the concave 91 on the lower sidewall 73 of the battery unit 7 engages the engagement piece 68 which is mounted in such a manner as to freely project from and extract to the opening 57, whereby the battery unit 7 is attached so as not to easily fall off. When the battery unit 7 is to be detached, a slidable engagement-piece button 67, which is integrated with the engagement piece 68 slides, disengaging the engagement piece 68 from the concave 91. Thus, the battery unit 7 may be taken out from the opening 57.

As shown in FIG. 10, when both the battery unit 7 and expansion unit 2 are loaded, the battery-unit extending portion 70 of the battery unit 7 is positioned under the thin portion 44 of the expansion unit 2 and they partially overlap each other. A level surface 71. of the battery unit 7 is then brought into close contact with the thin portion 44 of the expansion unit 2 so that an integrated surface of the battery-unit extending portion 70 and the thin portion 44 of the expansion unit 2 may form a continuous surface with other areas in the keyboard body of the portable electronic apparatus 1 at the bottom surface 60.

The battery unit 7 of the present embodiment extends longer than the expansion unit 2 in the moving direction of the expansion unit 2, and includes the connector 75 for electric connections next to the battery-unit extending portion 70 which overlaps the thin portion 44 of the expansion unit 2 and apart from the expansion unit 2 so as not to horizontally neighbor it. In addition, when both the battery unit 7 and expansion unit 2 are loaded, the thin oblique surface 52 is brought into contact with a battery oblique surface 74 of the battery unit 7. Accordingly, a space obtained by providing the thin oblique portion 52 on the expansion unit 2 is utilized for the connector 75 at a back of the computer from the battery oblique surface 74 of the battery unit 7, thereby maximizing the space in the computer body.

The circuit board 83 in the extension portion 70 effectively utilizes a space in the battery unit 7, and the improved mounting efficiency downsizes the battery unit 7.

Further, as shown in FIG. 10, the board 83 in the battery unit 7 is provided in the battery-unit extending portion 70 apart from the battery cell 84, and protected by the leakproof partition wall 90 from possible leakage problems. Accordingly, the battery unit of the present embodiment has a sufficient leakproof structure. In addition, this embodiment also protect from electronic circuits on the board 83 from possible leakage problems.

Further, the present invention is not limited to these preferred embodiments, but various variations and modifications may be made without departing from the spirit and scope of the present invention.

The present embodiment also discloses the following as illustrated in FIGS. 1 to 11 inclusive. The foregoing effects may be achieved by the following inventions.

The inventive battery unit attachable to an electronic apparatus that is detachably mounted with an expansion unit that realizes a predetermined function when connected to the electronic apparatus, the battery unit comprises a battery, and a housing that accommodates the battery, and partially overlaps the expansion unit in a thickness direction of the housing. The battery unit may further comprise a connector at a side surface thereof connectable with the electronic apparatus. The housing may include a battery-unit extending portion that may overlap the expansion unit in the electronic apparatus in the thickness direction of the housing, and wherein the battery unit further comprises a circuit board accommodated in the battery-unit extending portion. The battery-unit extending portion has a bent shape in the housing, and the battery unit further comprises a partition between the circuit board and the battery in the housing.

The inventive electronic apparatus comprises a main housing, an expansion unit that is detachably attached to the main housing, and realizes a predetermined function when the expansion unit is attached to the main housing, and a battery unit attachable to the main housing, the battery unit serving as a power supply and partially overlapping the expansion unit in a thickness direction of the battery unit. The expansion unit includes a thinner portion whereas the battery unit includes a battery-unit extending portion, and wherein the battery-unit extending portion and the thinner portion overlap each other and maintain a continuous surface with the main body. The battery unit extends longer than the expansion unit in a moving direction of the expansion unit in which the expansion unit is movable to be attached to and detached from the main housing, and wherein the battery unit includes a connector that is connectable to the electronic apparatus and outside the battery-unit extending portion. The expansion unit and the battery unit are made so stepwise to partially overlap each other. The expansion unit and the battery unit overlap each other by a surface contact in the electronic apparatus. The thinner portion includes a thin oblique surface that is obliquely provided relative to a moving direction of the expansion unit in which the expansion unit is movable to be attached to and detached from the main housing, and wherein the battery-unit extending portion includes a battery oblique surface that is obliquely provided relative to the moving direction to engage the thin oblique surface of the thinner portion. The expansion unit is detachably attached to the main body through a side of the main body, and the battery unit is detachably attached to the main body through a bottom of the main body.

As discussed, according to the battery unit and portable electronic apparatus or computer of the present invention, the battery-unit extending portion of the battery unit overlap the thin portion of the expansion unit in the thickness direction of the battery unit, thereby serving to efficiently utilize a limited space in the electronic apparatus or computer. Since the connector of the battery unit is placed at a position farther than the expansion unit, a space made by shaping the expansion unit 2 so as to include the thin oblique portion 52 may be efficiently utilized, thereby contributing to a downsizing of the electronic apparatus or computer. In addition, the battery unit may be provided with a board or a circuit in the battery-unit extending portion in which a battery cell is not directly located, whereby a space in the battery unit, electronic apparatus, or computer may be utilized efficiently.

What is claimed is:

1. A battery unit attachable to an electronic apparatus that is detachably mounted with an expansion unit that functionally extends the electronic apparatus when connected to the electronic apparatus, said battery unit comprising:
   a battery; and
   a housing that accommodates said battery, and partially overlaps the expansion unit in a thickness direction of said housing without adding any length to the housing.

2. The battery unit according to claim 1, further comprising a connector at a side surface thereof connectable with the electronic apparatus.

3. The battery unit according to claim 1, wherein said housing further comprising a battery-unit extending portion that may overlap the expansion unit in the electronic apparatus in the thickness direction of said housing, and
   wherein said battery unit further comprises a circuit board accommodated in the battery-unit extending portion.

4. The battery unit according to claim 1, wherein said battery-unit extending portion has a bent shape in said housing, and said battery unit further comprises a partition between the circuit board and said battery cell in said housing.

5. An electronic apparatus comprising:

a main housing;

an expansion unit that is detachably attached to said main housing, and functionally extends said electronic apparatus a predetermined function when said expansion unit is attached to said main housing; and a battery unit attachable to said main housing, said battery unit serving as a power supply and partially overlapping said expansion unit in a thickness direction of said battery unit without adding any length to the housing.

6. The electronic apparatus according to claim 5, wherein the expansion unit includes a thinner portion whereas said battery unit includes a battery-unit extending portion, and wherein the battery-unit extending portion and the thinner portion overlap each other and maintain a continuous surface contact with said main body.

7. The electronic apparatus according to claim 6, wherein said battery unit extends longer than said expansion unit along a moving direction of said expansion unit in which said expansion unit is movable moveably attached to and detached from said main housing, and wherein said battery unit includes a connector that is connectable to the electronic apparatus and outside the battery-unit extending portion.

8. The electronic apparatus according to claim 5, wherein said expansion unit and said battery unit are made with steps so as to partially overlap each other with stepwise.

9. The electronic apparatus according to claim 5, wherein said expansion unit and said battery unit overlap each other with surface contacts inside the electronic apparatus.

10. The electronic apparatus according to claim 6, wherein the thinner portion includes a thin oblique surface that is obliquely provided relative to a moving direction of said expansion unit in which said expansion unit is moveably attached to and detached from said main housing, and wherein the battery-unit extending portion includes a battery oblique surface that is obliquely provided relative to the moving direction to engage the thin oblique surface of said thinner portion.

11. The electronic apparatus according to claim 5, wherein said expansion unit is detachably attached to said main body through a side of said main body, and wherein said battery unit is detachably attached to said main body through a bottom of said main body.

* * * * *